Patented Aug. 5, 1941

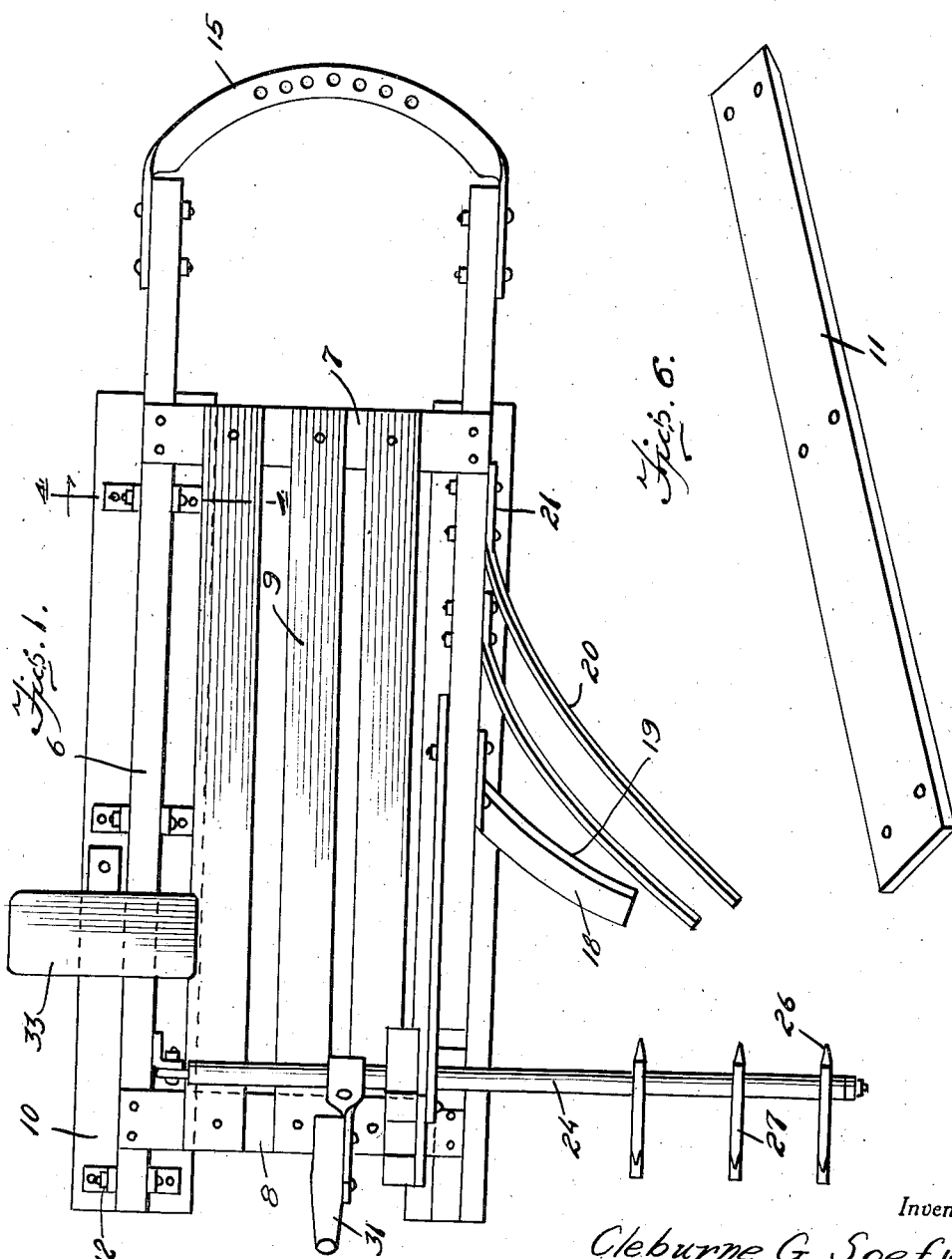

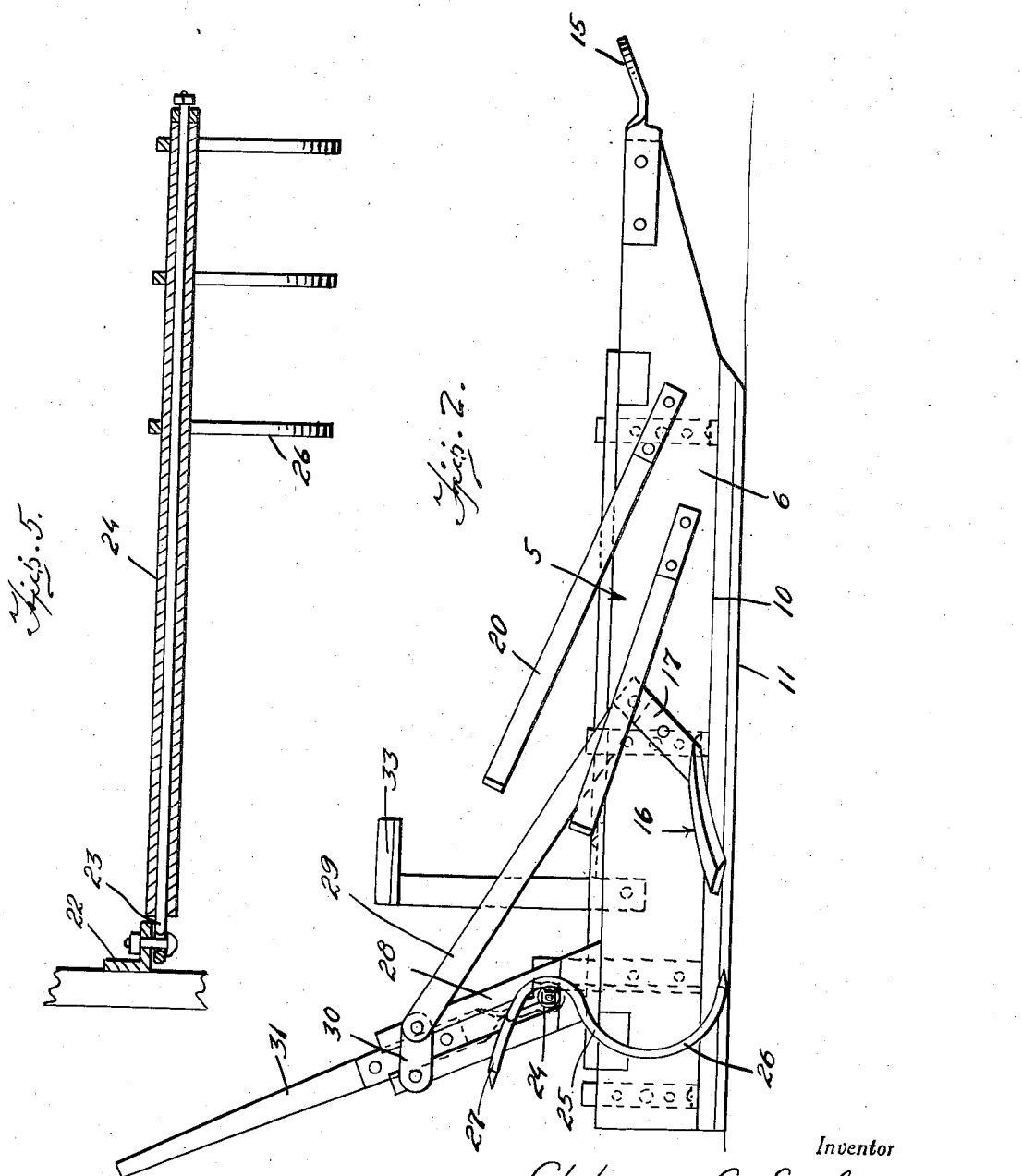

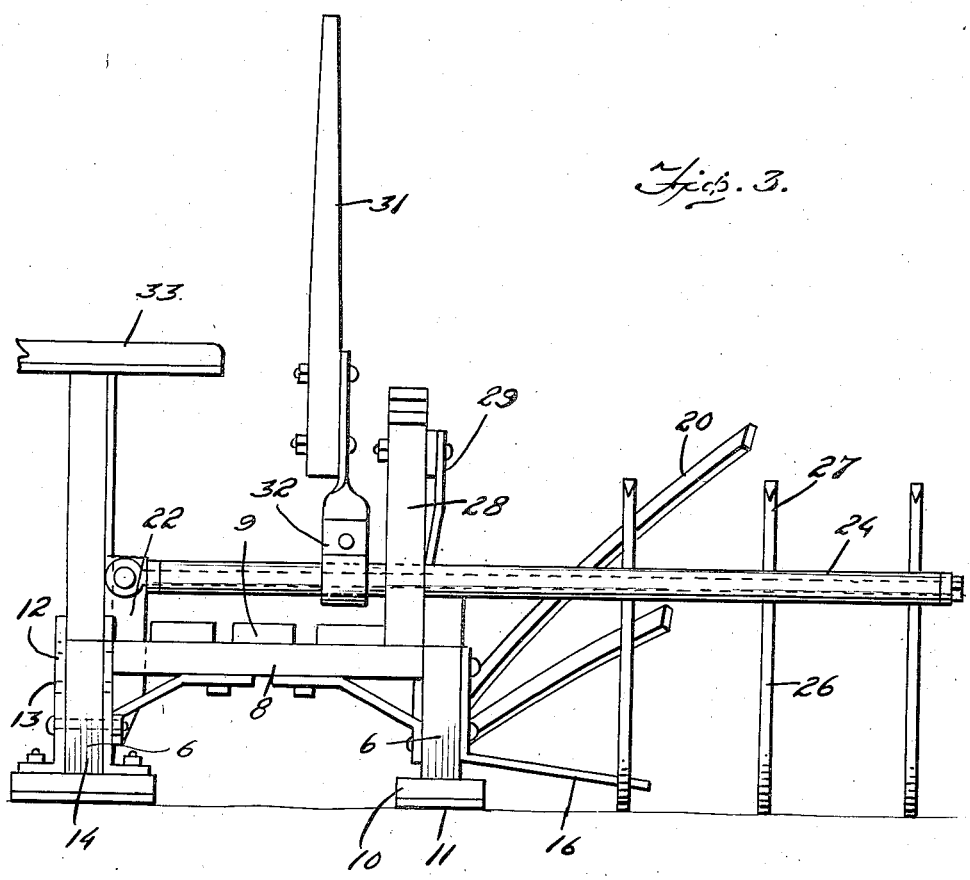
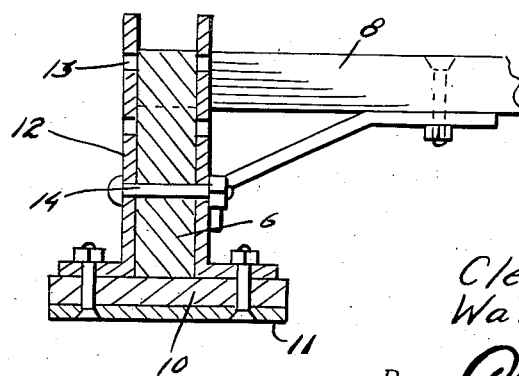

2,251,581

UNITED STATES PATENT OFFICE 2,251,581

COMBINED STALK CUTTER AND RAKE

Cleburne G. Soefje, Seguin, and Walter B. Soefje, Belmont, Tex.

Application October 18, 1940, Serial No. 361,786

3 Claims. (Cl. 56—100)

The present invention relates to new and useful improvements in combined stalk cutters and rakes adapted primarily for use in cutting green corn, cane, and other standing growths and has for an important object to provide means for simultaneously effecting the cutting of the stalk and raking the same, when cut, into windrows at suitable distances apart.

A further important object of the present invention is to provide a rake member positioned immediately behind the cutter and attached to a rotating arm or shaft to dump the stalks at predetermined intervals and also to provide a pivotal connection for the inner end of the shaft or arm by means of which the rake may be elevated to avoid obstructions.

A still further object is to provide a harvesting device of this character mounted on skids or runners and having means for elevating one of the runners to adjust the cutting position of the knife.

An additional object is to provide an apparatus of this character of simple and practical construction, which is strong and durable, efficient and reliable in performance and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a top plan view,

Figure 2 is a side elevational view,

Figure 3 is a rear elevational view,

Figure 4 is a vertical sectional view through the adjustable runner,

Figure 5 is a longitudinal sectional view through the rake arm or shaft, and

Figure 6 is a perspective view of one of the runners or skids.

Referring now to the drawings in detail, wherein for the purpose of illustration I have disclosed a preferred embodiment of the invention, the numeral 5 designates a sled including a pair of longitudinally extending spaced parallel beams 6 connected by front and rear cross members 7 and 8 respectively, and to which is secured the flooring or platform 9.

To the lower edges of the beams 6 are secured the runners 10 having the metal shoes 11 secured to the under side thereof.

The runners 10 at one side of the sled, are connected to the beam 6 by means of upstanding brackets 12 having vertically spaced openings 13 formed therein for receiving the transverse pins 14 whereby to secure the runners in adjusted position on the lower edge of the beam 6 and thus raise or lower the adjacent side of the sled.

To the front of the beams 6 is attached the draw-bar 15.

To the side of the sled opposite from the adjustable runner 10 is the cutter 16 which includes an upwardly extending end portion 17 secured flatwise against the side of the beam 6 and projecting angularly from the end portion 17 of the cutter is the blade portion 18 which projects substantially horizontally and at a rearwardly inclined position, as shown to advantage in Figure 1 of the drawings. The blade 18 is also of slightly arcuate form and is provided with the cutting edge 19 at the front edge thereof.

Positioned in advance of the cutter 16 is a plurality of stalk straightening arms 20 which have their inner ends 21 secured flatwise to the side of the beam 6 and project outwardly and rearwardly at an upwardly inclined angle from the side of the sled in spaced relation, one in advance of the other, as shown to advantage in Figure 1 of the drawings, the arms 20 also being of arcuate form and adapted to engage fallen stalks to raise the same upwardly into convenient cutting position for the cutter 16.

An upstanding bracket 22 is secured to the left hand beam 6 and to which is pivoted one end of an arm 23, the arm extending transversely across the top of the sled and outwardly beyond the right hand side thereof rearwardly of the cutter 16. Rotatably mounted on the arm 23 is a sleeve 24 and fixedly secured to the sleeve, at spaced intervals, are a plurality of rake teeth 25. The teeth are of arcuate form, as shown at 26, with their free ends normally extending forwardly as shown in Figure 2 of the drawings, and the teeth are formed at their upper ends with extensions 27 which project rearwardly, the extensions 27 being normally disposed above the arm 23 when the teeth 26 are in raking position and when the teeth 26 are swung rearwardly and upwardly into discharging position the extensions 27 are moved forwardly to constitute guards to prevent the stalks from falling upon the arm 23.

Rising from the beam 6 at the right hand side of the sled is a pair of upstanding spaced parallel guides 28, the guides being inclined rearwardly and between the guides the arm 23 is slidably positioned for upward swinging movement of the free end of the arm. A forwardly extending brace 29 is attached to the guide and a cross member 30 extends across the space between the guides, at their upper ends, to act as a stop to limit the upward movement of the arm.

A lever 31 is secured to the sleeve 24, adjacent its inner end, by means of a clamping member 32, the lever being adapted to rotate the sleeve 24 whereby to raise and lower the rake 26 and also being adapted to raise the outer end of the arm 23 and sleeve 24 to elevate the rake in order to avoid obstructions, or when it is desired to move the rake into an inactive position.

Secured to the sled at the side thereof opposite from the rake is a seat structure 33.

It will be observed from an inspection of Figure 2 of the drawings that should the rake come into contact with an obstruction that the inclined guides 28 will enable the arm 23 and sleeve 24 to automatically raise upwardly to release the rake from such obstruction, the free rotation of the sleeve 24 on the arm 23 further facilitating the disengagement of the rake from such obstruction.

It is believed the details of construction, operation and advantages of the device will be readily understood from the foregoing without further detailed explanation.

Having thus described the invention, what we claim is—

1. A combined stalk cutter and rake comprising a sled having runners at the lower edges thereof, means for vertically adjusting one of the runners to raise or lower one side of the sled, a cutter projecting outwardly from the opposite side of the sled and a rake projecting outwardly from said last named side of the sled in a position rearwardly of said cutter, said cutter being rigidly mounted on said opposite side of the sled for tilting to level the same relative to the ground under raising and lowering of said one side of the sled.

2. A combined stalk cutter and rake comprising a sled, an arm extending transversely across said sled and beyond one side thereof, said arm having an end pivotally mounted on top of the sled for swinging movement about an axis arranged to provide for swinging of the arm upwardly and rearwardly, a sleeve rotatable on the arm and swingable therewith, rake teeth fast on the sleeve for rotation thereby into and from raking position and for upward movement to clear obstructions on the upward swinging of said arm and sleeve, an upwardly and rearwardly inclined guide on said sled straddling said sleeve to brace the same and said arm during swinging thereof, and a lever fixed to said sleeve for rotating the teeth into and from raking position, said lever being operative to swing said sleeve and arm.

3. A combined stalk cutter and rake comprising a sled, an arm extending transversely across said sled and beyond one side thereof, said arm having an end pivotally mounted on top of the sled for swinging movement about an axis arranged to provide for swinging of the arm upwardly and rearwardly, a sleeve rotatable on the arm and swingable therewith, rake teeth fast on the sleeve for rotation thereby into and from raking position and for upward movement to clear obstructions on the upward swinging of said arm and sleeve, an upwardly and rearwardly inclined guide on said sled straddling said sleeve to brace the same and said arm during swinging thereof, a lever fixed to said sleeve for rotating the teeth into and from raking position, said lever being operative to swing said sleeve and arm, a stationary cutter bar extending from said one side of the sled in advance of said teeth, and a plurality of stalk lifter blades extending from said one side of the sled in advance of the cutter bar at different levels.

CLEBURNE G. SOEFJE.
WALTER B. SOEFJE.